C. H. TAYLOR.
THREAD OR WORM CUTTER.
APPLICATION FILED SEPT. 23, 1916.
1,273,421.
Patented July 23, 1918.
2 SHEETS—SHEET 2.
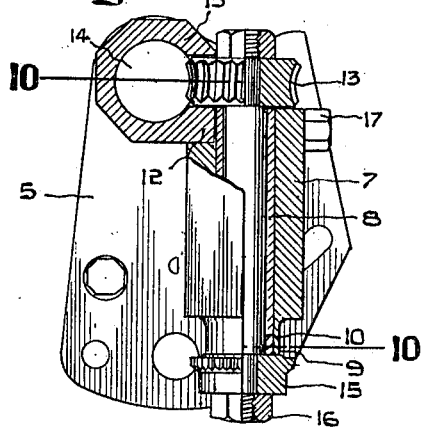
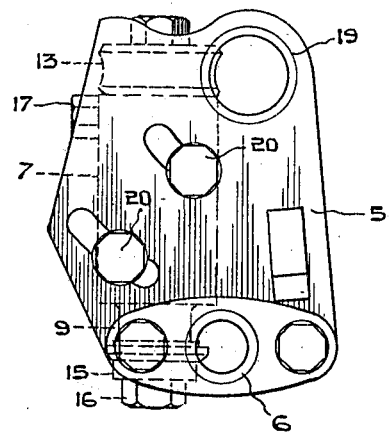
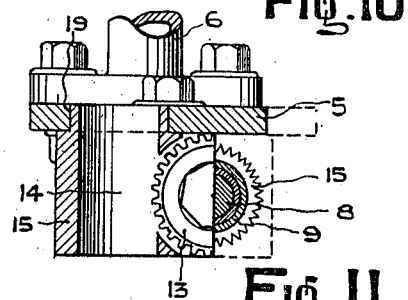
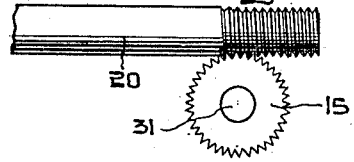
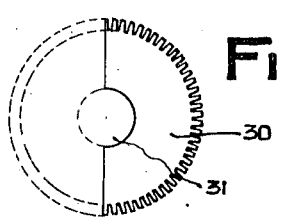
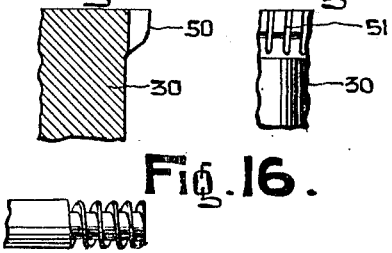
Witnesses:
Gordon G. Cooke
William J. C. Hewetson
Charles H. Taylor
Inventor
per Attorney
William F. McVeit

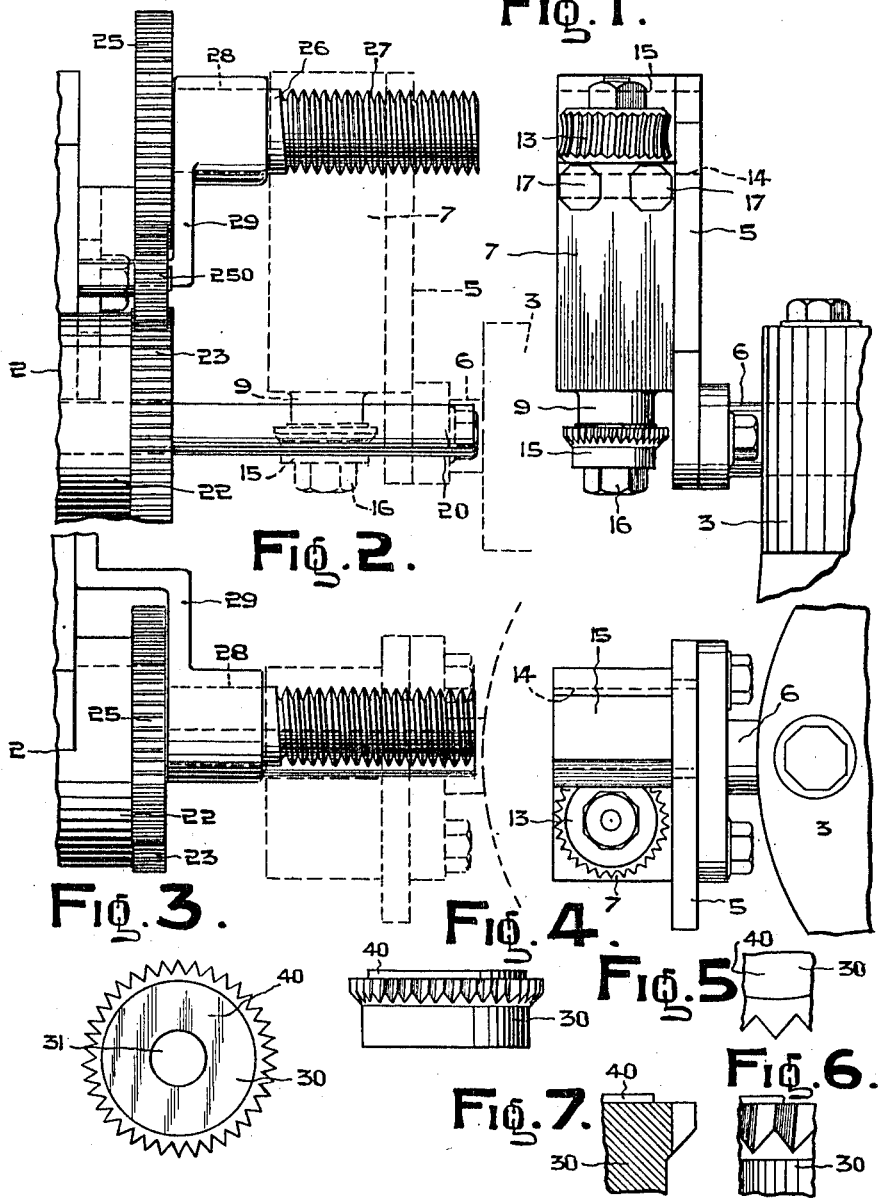

UNITED STATES PATENT OFFICE.

CHARLES HAVELOCK TAYLOR, OF TORONTO, ONTARIO, CANADA.

THREAD OR WORM CUTTER.

1,273,421. Specification of Letters Patent. Patented July 23, 1918.

Application filed September 23, 1916. Serial No. 121,789.

*To all whom it may concern:*

Be it known that I, CHARLES HAVELOCK TAYLOR, of the city of Toronto, in the Province of Ontario, Dominion of Canada, have invented certain new and useful Improvements in Thread or Worm Cutters; and I do hereby declare that the following is a full, clear, and exact description thereof.

My invention relates to thread or worm cutters of the type known in the art of metal cutting as a rotary chasing-tool; and it has reference more particularly to attachments for power or manually operated machines comprising other implements for imparting special form to a blank, as in a turret lathe for instance, although the tool or implement disclosed herein may be used in other combinations without departing from my invention.

The invention may be said broadly to consist of a tool for cutting a thread or worm, comprising a plurality of teeth having consecutive revoluble cutting actions in a direction parallel to the axis of stock having rotation in a direction to impart thereto movement with relation to the tool and transversely to the axis of the stock.

More specifically stated the invention consists of an attachment for the turret of a machine of the type above identified and comprising, for co-action with a driving member carried by the head stock, a shank for a cutting tool, driven means upon one end thereof for operative engagement with the driving member when the turret slide carries the attachment into position with its driven member in operative relation with the driving member, and a tool on the opposite end of the spindle being the toothed cutting tool above described.

Other features of the invention are the particular driving and driven devices carried respectively by the spindle head and turret attachment and consisting of a worm for the driving member, and a hollow cylindrical guide in the attachment which receives the worm, and a worm-wheel constituting the driven member mounted rigidly on the tool shank.

For full comprehension, however, of my invention reference must be had to the accompanying drawings forming part of this specification in which similar reference characters indicate the same parts and wherein:

Figure 1 is a front elevation of the improved attachment illustrating the application thereof to a turret lathe;

Fig. 2 is a plan view thereof;

Fig. 3 is an enlarged detail plan view of the thread cutting tool;

Fig. 4 is a side elevation thereof;

Fig. 5 is an enlarged detail view of one of the teeth of the cutter;

Fig. 6 is a front elevation thereof;

Fig. 7 is a sectional view of a portion of the cutter illustrating one of the teeth in elevation;

Fig. 8 is an elevation partly in section of the improved attachment looking toward the turret;

Fig. 9 is a similar view to Fig. 8 looking in the opposite direction;

Fig. 10 is a part elevation and part sectional view of the attachment, the section being taken on line 10—10 Fig. 8;

Fig. 11 is an elevation of the stock and cutter and a portion of the driving mechanism illustrating the relative corresponding intermeshing action of the stock and cutter and the parts of the driving mechanism respectively.

Fig. 12 is a side elevation of the worm cutting tool;

Fig. 13 is a plan view thereof;

Figs. 14 and 15 are, respectively, elevations of one of the teeth drawn to an enlarged scale; and Fig. 16 is an elevation of the worm cut by the tool illustrated in Fig. 13.

My invention, for purposes of illustration is shown applied to a turret lathe, the usual head stock of which is indicated at 2 and the turret at 3.

The improved attachment, which is mounted on the turret, consists of a carrier plate 5, the lower end of which has rigidly secured thereon the usual flanged shank 6 which is inserted into and carried by the turret. This plate carries a prism-like block 7 which in turn carries the cutting tool, the prism-like quality of the block possessing the necessary solidity to abut and transmit to the turret successive and overlapping cutting actions of the tool. The lower end of this carrier block is formed with an integral downwardly projecting boss 9 having an axial boring 10 which extends throughout the length of the block and has a shaft 8 mounted therein. Both ends of this shaft are reduced and the lower end has a specially designed rotary cutter 15 rigidly mounted thereon and held in place by a nut 16 with the upper end of the cutter bearing upon and sustained in the performance of its function by the lower end of the boss the upper end of the shaft having a worm wheel 13 mounted rigidly thereon and intersecting a boring 14 in a transverse block 15 which has one of its corners 12 embedded in the top of the carrier block having this transverse block rigidly secured thereto by screws 17. This boring acts as a guide for the worm in maintaining it in proper operative position relatively to the worm wheel. This transverse block is disposed in position with its boring at right angles to the tool shaft; and the relative positions of these blocks are fixed and the tool adjustably held relatively to the stock by the carrier plate 5, a boring 19 in which receives one end of the block 15 which is diminished and projects in the form of a sleeve for the purpose. The plate has a pair of slots curved concentrically to the boring 19, and a pair of screws 20 pass through them and fasten the plate and block 7 together with provision for the relative adjustment required as will be presently further alluded to. In order to mount this attachment in the turret, the carrier plate has the usual flanged shank 6 fastened thereto, the shank being adapted to be inserted into the turret and secured thereto in the usual manner.

The stock 20 for this embodiment of my invention is in the form of a round bar equal in diameter to the full diameter of threaded article to be produced. It is fed intermittently through the axis of the spindle head and projected from the center of the collet which holds it rigidly therein during the intermissions between the feeding actions. The collet and the feeding mechanism, although essential to the operation of my threading mechanism, are of standard type and well known to those familiar with turret lathes; and although the spindle head and collet, as well as the turret, are indicated for the purpose of illustrating a practical application of the invention, they are not described in detail for the reason given.

It is important that the stock be rotated, and in order to obtain a positive relation between the rotation of the cutter and stock, the former derives its motion from the spindle. To this end the spindle-cap, indicated at 22 (Fig. 1) has a spur gear 23 either formed as an integral part of or rigidly mounted upon it, and as it (the spindle-cap) is rotated by the usual mechanism of the spindle head, the gear in turn rotates the driving member of my attachment through the medium of a companion spur-gear 25 and an idler 250. This driving member consists of an arbor 26 one end of which and the major portion of its length is bored and has a double external right-hand worm 27 cut therein, while the opposite end 28 is journaled in a bearing bracket 29 bolted to the head-stock, this end being further reduced and screw-threaded with a left-hand thread and having the spur gear 25 screwed thereon. The diameters of the boring 14 and the worm are substantially equal to secure a sliding fit of the block over the worm, and to insure the engagement of the worm wheel with the worm with minimum lost-motion.

In the machine illustrated the relative sizes and rates of rotation of the driving and driven members, including the cutter must be such as to produce the lead required for the thread to be cut.

As thus far described the attachment is ready for operation, different cutting tools are required, however, for different work, and in order to set forth uses to which the invention may be put, I will describe the tools necessary to cut an ordinary standard thread and a special worm. Both of these tools are of the same general construction in that each has a comparatively flat solid cylindrical body 30 with a central boring 31 and its cutting teeth are around the circumferential edge of one end of the cylinder. The cutters are illustrated in detail, the cutter for the standard thread in Figs. 3 and 4 and the special worm cutter in Figs. 12 and 13.

Referring to the cutter shown in Figs. 3 and 4 it will be seen that the teeth are substantially radial and of acute angular form when viewed toward either face of the tool, (Figs. 3 and 5) and when viewed in elevation (Figs. 4 and 6) present straight knife edges oblique to the axis of the tool, the faces of the teeth coinciding with the end of the tool lying in a plane at right angles to the axis thereof, and a shoulder 40 spaces it from the lower end of the boss 9; while the opposite faces are inclined to abut and strengthen the cutting edges. This formation of the tooth is clearly shown in Fig. 6.

The cutter for the special worm is essentially the same as the tool just described, the particular form of the teeth being the distinguishing structural feature. The teeth of this cutter present, when viewed in plan toward the toothed edge of the tool, slightly radially converging sides (Fig. 13) with rounded corners, the outer ends, owing to the circular form of the tool, being concentric to the axis. These are the cutting edges of the teeth. The depth of the teeth, from their cutting edges toward the opposite end of the tool, is inclined slightly inward toward the body as shown at 50 in Fig. 15 and also inclined downwardly from right to left as shown at 51 in Fig. 14. This tool is adapted to cut a worm illustrated partly in elevation and partly in Fig. 16.

*Operation.*

In the operation of a machine embodying my invention the carrier block 7 is first adjusted and set in position relatively to the stock to have the teeth of the cutting tool cut into the perimeter of the stock to the required extent, after which the machine is started and the driving worm is made to rotate continuously while the machine is in action. Then the turret is swung, to place the boring 14 in axial alinement with the driving worm and to envelop it when shifted. Immediately the worm wheel engages the worm as the turret continues to advance, and the worm wheel runs along the worm, which in this action has the function of a rack, the tool rotates and causes its teeth to progress along the rotating stock in the direction of the head-stock and simultaneously cut into it. The effect of the combination of the successive revoluble cutting actions and the relative travel between the rotating stock and the teeth, is that either a thread or a worm or a multiple thread or multiple worm, is cut in the perimeter of the stock according to the particular form of the teeth of the cutter and the relative rates of speed of rotation of the stock and cutter. The cutting is done and the thread or worm completed during the single forward movement of the tool, and in effect a revolving chasing action is produced.

During the retrogression of the tool its teeth intermesh with the convolutions of the thread or worm without interference therewith, and this result is obtained by making the tool and worm wheel of the same pitch-diameter. This relation of size and rate of rotation results in constantly keeping the thread or worm on the stock in the same relation to each other as the worm-wheel and worm, and consequently the cutter may be withdrawn without damage to the threads cut.

What I claim is as follows:

1. The combination with a rotary stock holder and a slide movable to and from the stock holder, of an attachment mounted upon said slide, a shaft mounted in said attachment with its ends protruding therefrom, a thread or worm cutting tool mounted upon one of such protruding ends and adapted to intersect the perimeter of the stock when the slide is reciprocated, a worm wheel upon the opposite end of said shaft, a worm in rotative relation with the stock holder and adapted to engage the worm-wheel when the slide is moved toward the stock holder.

2. The combination with a rotary stock holder and a slide movable to and from the stock holder, of an attachment mounted upon said slide and consisting of a prism-like member, a shaft mounted in said member with its ends protruding therefrom, a thread or worm cutting tool mounted upon one of such protruding ends and adapted to intersect the perimeter of the stock when the slide is reciprocated, a worm wheel upon the opposite end of said shaft, a worm in rotative relation with the stock holder and adapted to engage the worm-wheel when the slide is moved toward the stock holder, said worm and worm-wheel having a relative intermeshing action corresponding with the relative intermeshing action of the tool and thread or worm cut for the purpose of permitting retrograde movement of the tool without damage to said cut thread or worm.

3. The combination with a stock holder; of a tool carrying attachment consisting of a carrier plate, a prism-like member mounted upon said carrier plate, a thread or worm cutting tool carried by said member and adapted to rotate in a direction at right angles to the direction of rotation of the stock and adjustable means whereby the tool may be moved transversely to the axis of the stock for the purpose of varying the depth of the cut, said means consisting of slots in said carrier plate and bolts passed through said slots and screwed into said prism-like member.

4. The combination with a rotary stock holder, of a reciprocatory attachment, a rotary thread or worm cutting tool mounted upon the attachment, a worm-wheel movable in unison with the tool, a worm in rotative relation with the stock holder and a guide consisting of a block rigidly mounted upon the attachment and presenting a boring intersected by the worm-wheel and adapted to receive the worm when the tool is brought into engagement with the stock and retain the worm in operative engagement with the worm-wheel.

5. In a thread or worm cutting machine the combination with a head-stock forming a component part thereof; of a collet rotatably carried by the head-stock and adapted to have the stock rigidly carried therein, an arbor mounted upon the head-stock and having one end protruding and formed with the worm; a turret also forming a component part of the machine, an attachment for the turret having a shaft rotatably mounted therein and disposed with its axis in a plane at right angles to the stock; a worm-wheel mounted rigidly upon the upper end of the shaft; a cutting tool mounted rigidly upon the lower end of the shaft, the attachment being constructed and arranged to support the worm-wheel in line with the worm to engage the same and means for moving the turret and slide to and from position with the worm inserted into the turret.

6. In a thread or worm cutting machine the combination with a head-stock forming a component part thereof; of a collet rotatably carried by the head-stock and adapted to have the stock rigidly carried therein; an arbor mounted on the head-stock and having one end protruding and formed with a worm; a turret also forming a component part of the machine, an attachment for the turret comprising a carrier block, a shaft rotatably mounted perpendicularly in said carrier block and having a rotary cutter on its lower end, a longitudinally bored transverse block rigidly mounted upon said carrier block at the upper end thereof and having one end reduced, a worm-wheel rigidly mounted upon the upper end of said shaft and intersecting said boring, a carrier plate having an opening, means whereby the carrier plate is secured to the turret, means fastening the carrier block to the plate with the reduced end of the transverse block journaled in the opening in the plate and the boring located in axial alinement with the worm.

7. In a thread or worm cutting machine the combination with a head-stock forming a component part thereof; of a collet rotatably carried by the head-stock and adapted to have the stock rigidly carried therein; an arbor mounted on the head-stock and having one end protruding and formed with the worm; a turret also forming a component part of the machine, an attachment for the turret, comprising a carrier block, a shaft rotatably mounted perpendicularly in said carrier block and having a rotary cutter on its lower end; a longitudinally bored transverse block rigidly mounted upon said carrier block at the upper end thereof and having one end reduced, a worm-wheel rigidly mounted upon the upper end of said shaft and intersecting said boring; a carrier plate having an opening, means whereby the carrier plate is secured to the turret, means fastening the carrier block to the plate with the reduced end of the transverse block journaled in the opening in the plate and the boring located in axial alinement with the worm; the said fastening means consisting of slots in the carrier plate arranged concentrically to the axis of the boring and bolts passed through said slots and screwed into the carrier plate for the purpose of varying the depth of the cut.

8. The combination with a rotary stock holder; of an attachment movable to and from the stock holder and consisting of a carrier plate having an opening therein, a prism-like member mounted on the said plate, a shaft carried by said member with its ends protruding therefrom, a rotary thread or worm cutting tool mounted upon one of such ends, a worm-wheel mounted upon the opposite end of said shaft, a worm in rotative relation with the stock holder and a guide consisting of a block having a boring intersected by the worm-wheel and located in the axial plane of the worm, said boring being adapted to receive the worm when the tool is moved into engagement with the stock and maintain such worm in operative engagement with the worm-wheel, said guide having a reduced end journaled in said opening in the carrier plate, and means for adjusting the prism-like member upon the carrier plate for the purpose of varying the depth of the cut in the stock, said last mentioned means consisting of slots in the carrier plate and bolts passed through said slots into the prism-like member, said slots being arragned concentrically to the axis of the boring of the guide for the purpose of enabling the reduced end to be used as a pivot during adjustment.

9. A rotary thread or worm cutting tool having a plurality of teeth upon its perimeter and having a revoluble cutting action in a direction parallel to the axis of the stock, said teeth being of acute angular form with their apices constituting knife edges extending parallel to the axial plane of the latter when viewed in axial section and at an angle to the said axis when viewed at right angles thereto.

In testimony whereof I have signed my name to this specification in the presence of two witnesses.

CHARLES HAVELOCK TAYLOR.

Witnesses:
H. M. CHRISTMAN,
C. W. MARTIN.